(12) United States Patent
Elezaj

(10) Patent No.: US 9,156,411 B2
(45) Date of Patent: Oct. 13, 2015

(54) VEHICLE ROOF STORAGE SYSTEM

(76) Inventor: Frank Elezaj, Leonard, MI (US)

( * ) Notice: Subject to any disclaimer, the term of this patent is extended or adjusted under 35 U.S.C. 154(b) by 646 days.

(21) Appl. No.: 12/989,693

(22) PCT Filed: May 14, 2009

(86) PCT No.: PCT/US2009/043955
§ 371 (c)(1),
(2), (4) Date: Oct. 26, 2010

(87) PCT Pub. No.: WO2009/140496
PCT Pub. Date: Nov. 19, 2009

(65) Prior Publication Data
US 2011/0042432 A1    Feb. 24, 2011

Related U.S. Application Data

(60) Provisional application No. 61/102,209, filed on Oct. 2, 2008, provisional application No. 61/053,167, filed on May 14, 2008.

(51) Int. Cl.
*B60R 9/048* (2006.01)
*B60R 9/042* (2006.01)

(52) U.S. Cl.
CPC ............ *B60R 9/0485* (2013.01); *B60R 9/0423* (2013.01)

(58) Field of Classification Search
CPC .... B60R 9/0423; B60R 9/0485; B60R 9/042; B60R 9/045
USPC .................. 224/310, 321, 324–325, 552, 281
See application file for complete search history.

(56) References Cited

U.S. PATENT DOCUMENTS

| 3,877,624 A | * | 4/1975 | Carson | 224/323 |
| 3,904,094 A | * | 9/1975 | Correll | 224/324 |

(Continued)

FOREIGN PATENT DOCUMENTS

| DE | 3719974 A1 | 12/1987 |
| DE | 3826662 A1 | 2/1990 |

(Continued)

OTHER PUBLICATIONS

International Search Report PCT/US2009/043955, dated Jan. 11, 2010 (Published as WO2009/140496).

*Primary Examiner* — J. Gregory Pickett
*Assistant Examiner* — John Cogill
(74) *Attorney, Agent, or Firm* — The Dobrusin Law Firm, P.C.

(57) ABSTRACT

An apparatus for securing a device to an exterior of a vehicle, comprising: a plurality of rail members spaced apart and substantially parallel each other, each rail member has two ends; a first and second pair of mounting brackets configured to be fixedly or detachably attached to a portion of the vehicle, wherein two rail members are in communication with the mounting brackets; a first and second transverse member having two ends, and the ends of the transverse members are in communication with the mounting brackets; a wagon member, having two ends, and the ends, of the wagon member are in communication with the rail members; the wagon member is moveable, and further comprises a cradle; a restraining member having two ends, and the restraining member is in communication with the rail members; the restraining member is stationary, rotatable, and comprises a restraining arm, which contacts the device to prevent movement.

20 Claims, 7 Drawing Sheets

(56) References Cited

U.S. PATENT DOCUMENTS

| | | | |
|---|---|---|---|
| 4,058,243 A | 11/1977 | Tappan | |
| 4,170,331 A * | 10/1979 | Faulstich | 224/324 |
| 4,234,285 A | 11/1980 | Martinez | |
| 4,291,823 A * | 9/1981 | Freeman et al. | 224/310 |
| 4,390,117 A * | 6/1983 | Fagan | 224/310 |
| 4,616,771 A * | 10/1986 | Heideman | 224/321 |
| 4,618,083 A * | 10/1986 | Weger, Jr. | 224/324 |
| 4,953,757 A | 9/1990 | Stevens | |
| 5,172,952 A | 12/1992 | Lasnetski | |
| 5,186,588 A * | 2/1993 | Sutton et al. | 410/120 |
| 5,456,512 A * | 10/1995 | Gibbs et al. | 296/37.7 |
| 5,469,933 A | 11/1995 | Thomason | |
| 5,474,217 A | 12/1995 | Mandarino | |
| 5,505,579 A | 4/1996 | Ray | |
| 5,544,796 A * | 8/1996 | Dubach | 224/310 |
| 5,632,591 A | 5/1997 | Henriquez | |
| 5,850,891 A * | 12/1998 | Olms et al. | 182/127 |
| 6,029,873 A | 2/2000 | Won et al. | |
| 6,729,513 B2 | 5/2004 | Kmita et al. | |
| 6,779,696 B2 | 8/2004 | Aftanas et al. | |
| 6,796,471 B2 | 9/2004 | Aftanas et al. | |
| 6,827,244 B1 * | 12/2004 | Stapleton et al. | 224/310 |
| 7,198,184 B2 | 4/2007 | Aftanas et al. | |
| 7,210,559 B2 * | 5/2007 | Hickey | 182/127 |
| 7,780,050 B2 * | 8/2010 | Tucker | 224/310 |
| 2003/0178456 A1 * | 9/2003 | Deakin | 224/319 |
| 2007/0039985 A1 | 2/2007 | Warren et al. | |
| 2008/0035689 A1 * | 2/2008 | Murray et al. | 224/310 |
| 2008/0290123 A1 * | 11/2008 | Sprague | 224/321 |
| 2011/0214944 A1 * | 9/2011 | Levi | 182/127 |

FOREIGN PATENT DOCUMENTS

| | | |
|---|---|---|
| DE | 4018009 A1 | 12/1991 |
| DE | 19954835 A1 | 5/2001 |
| EP | 0967119 A2 | 6/1999 |
| FR | 2862584 A1 | 5/2005 |
| JP | 08156707 A | 6/1996 |
| JP | 08253080 A | 10/1996 |
| JP | 11157395 A | 6/1999 |

* cited by examiner

VEHICLE ROOF STORAGE SYSTEM

CLAIM OF BENEFIT OF FILING DATE

The present application claims the benefit of the filing date of PCT Application Serial No. PCT/US2009/043955 (filed May 14, 2009) (Published as WO 2009/140496) and 61/053,167 (filed May 14, 2008), and 61/102,209 (filed Oct. 2, 2008) the contents of which are hereby incorporated by reference in their entirety.

FIELD OF INVENTION

The present invention relates generally to vehicle roof top carriers, and more particularly, to a ladder storage roof top carrier used to secure a ladder on or above the roof of a vehicle, and to prohibit the ladder from sliding off the roof top.

BACKGROUND OF THE INVENTION

Vehicle roof storage systems have been in use for many years. Past designs have required the user to exert substantial effort in placing items in the carrier and safely securing the items in the storage system. Moreover, the securing systems often failed and additional steps were required to safely secure the contents to the storage systems. Examples of efforts to provide vehicle roof storage systems include those disclosed in U.S. Pat. Nos. 4,058,342, 4,234,285, 4,953,757, 5,469,933, 5,505,579, and 5,632,591, all incorporated by reference.

Despite these efforts there has remained a need in the art for improved vehicle roof storage systems that meet one or more of the following needs: it is relatively easy to load items in the roof top carrier (e.g. a ladder or a boat); it is relatively easy to place items in a storage box located on the carrier, which stores long items (e.g. tubing or lumber); items are securely locked to the storage system; the storage system is durable (e.g. the locking system or ladder carrier members do not break when banged with a ladder); the system is relatively lightweight; it is relatively easy to assemble and attach; and the system can easily conform different vehicles.

SUMMARY OF THE INVENTION

The present invention meets some or all of the above-mentioned needs by providing an improved vehicle roof storage system that is premised upon employing a moveable carrier member, which holds one end of the ladder and assists in loading the ladder; a support at the second end of the ladder that assists in loading and may contain rollers, and a rotatable restraining cross member with a restraining and/or locking mechanism.

In one aspect the invention contemplates an apparatus for securing a device to an exterior of a vehicle, comprising: a plurality of longitudinally extending rail members being spaced apart and substantially parallel to one another, wherein each longitudinally extending rail member has a first end and a second end; at least a first pair of mounting brackets and at least a second pair of mounting brackets configured to be at least one of (i) fixedly attached to a portion of the vehicle or (ii) detachably attached to a portion of the vehicle, wherein at least two rail members are in communication with the first pair, second pair, or both pairs of mounting brackets; at least a first transverse cross member and a second transverse cross member, wherein each transverse cross member has a first end and a second end, and the first end, second end, or both ends of the first transverse cross member and second transverse cross member are in communication with the at least first or second mounting brackets; at least one wagon cross member, wherein the wagon cross member has a first end and a second end, and the first end, second end, or both ends of the at least one wagon cross member is in communication with at least one of the plurality of longitudinally extending rail members; wherein the at least one wagon cross member is moveable, and the at least one wagon cross member further comprises at least one cradle; at least one restraining cross member wherein the restraining cross member has a first end and a second end, and the first end, second end, or both ends of the at least one end of the restraining cross member is in communication with at least one of the plurality of longitudinally extending rail members; and wherein the at least one restraining cross member is stationary and the at least one restraining cross member further comprises an restraining arm, which comes into contact with the device so that the device will not move while in the apparatus, wherein a portion of the restraining cross member rotates.

The aspect of the invention may be further characterized by one or any combination of the following features: the mounting bracket is configured to at least partially surround a portion of the first end, second end, or both ends of the at least first transverse cross member, second transverse cross member, or both transverse cross members; the first end, second end, or both ends of the at least first transverse cross member, second transverse cross member, or both transverse cross members are fixedly attached to the mounting bracket; the apparatus is configured to support at least one device, and the at least one device is a ladder; at least one of the longitudinally extending rail members are configured to support a storage box; the moveable wagon cross member includes at least one roller on the first end, second end, or both ends; the moveable wagon cross member is free of a roller on the first end, second end, or both ends; the plurality of longitudinally extending rail members further comprise a channel; the channel is further comprised of a bearing surface; the moveable wagon cross member is configured to rest in the channel of at least one of the longitudinally extending rail member; the restraining cross member is fixedly attached to at least one of the longitudinally extending rail members; the restraining cross member further comprises a lever arm; the restraining cross member further comprises an assist mechanism; the longitudinally extending rail members further comprise an end cup on the first end, second end, or both ends; the at least first transverse cross member and second transverse cross member contain a plurality of bores so that additional longitudinally extending rail members can be secured to the transverse cross members; the storage box is fixedly attached to the at least one longitudinally extending rail member; the storage box is removeably attached to the at least one longitudinally extending rail member; the cradle attached to the moveable wagon cross member is generally C shaped; the cradle contains a deep recess adapted to hold a device; and the cradle contains an outwardly projecting arm.

DETAILED DESCRIPTION

A vehicle roof storage system according to an exemplary embodiment of the present invention will be described in detail with reference to the accompanying drawings. Referring to FIGS. 1-7, an exemplary embodiment of a vehicle roof storage system 10, in accordance with the present invention is shown.

Figure 1:
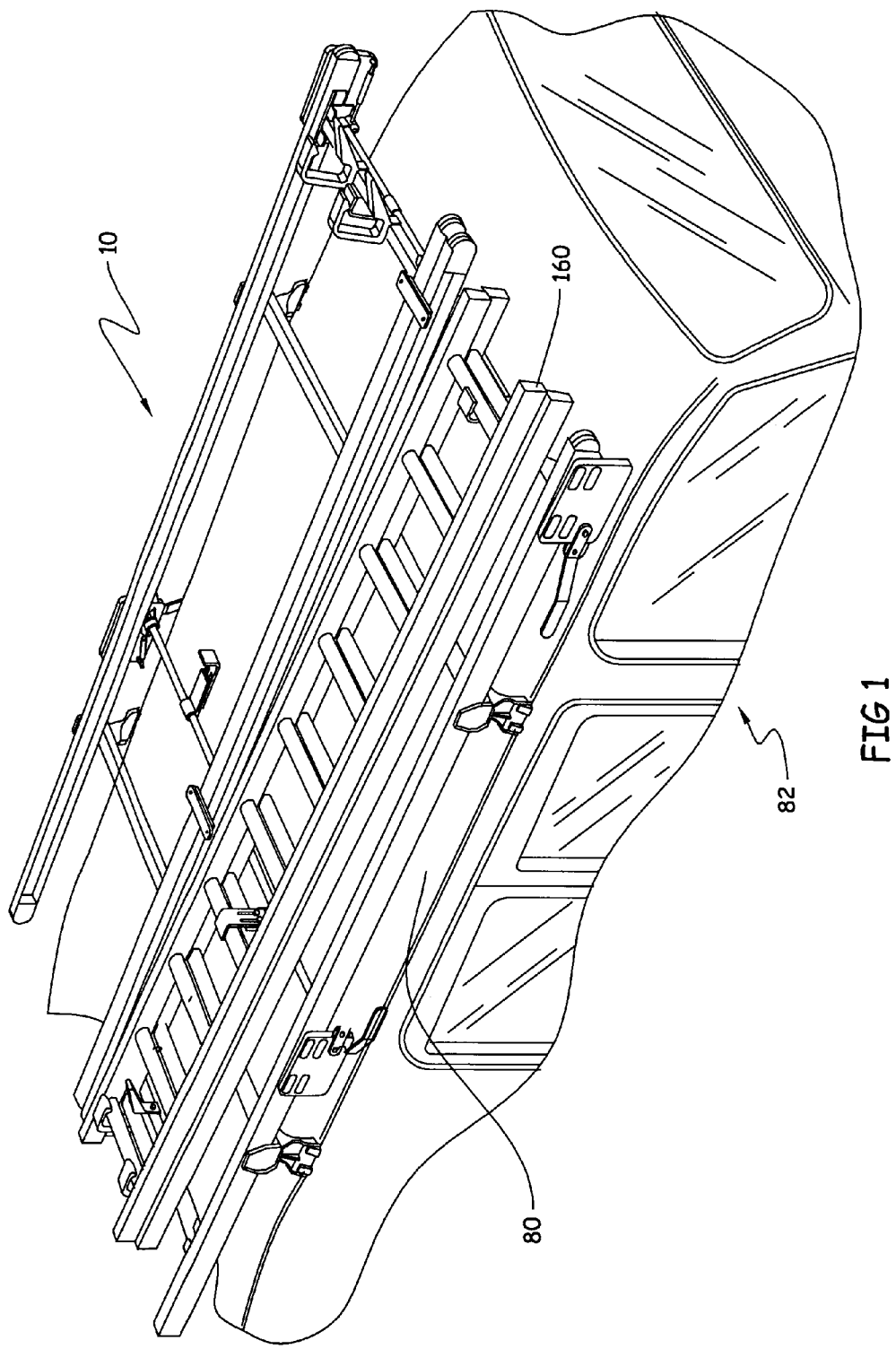
FIG. 1 is a top view of a vehicle having the vehicle roof storage system of the present invention attached thereon, as shown the apparatus is displayed as a double rack apparatus including a ladder.
Figure 2:
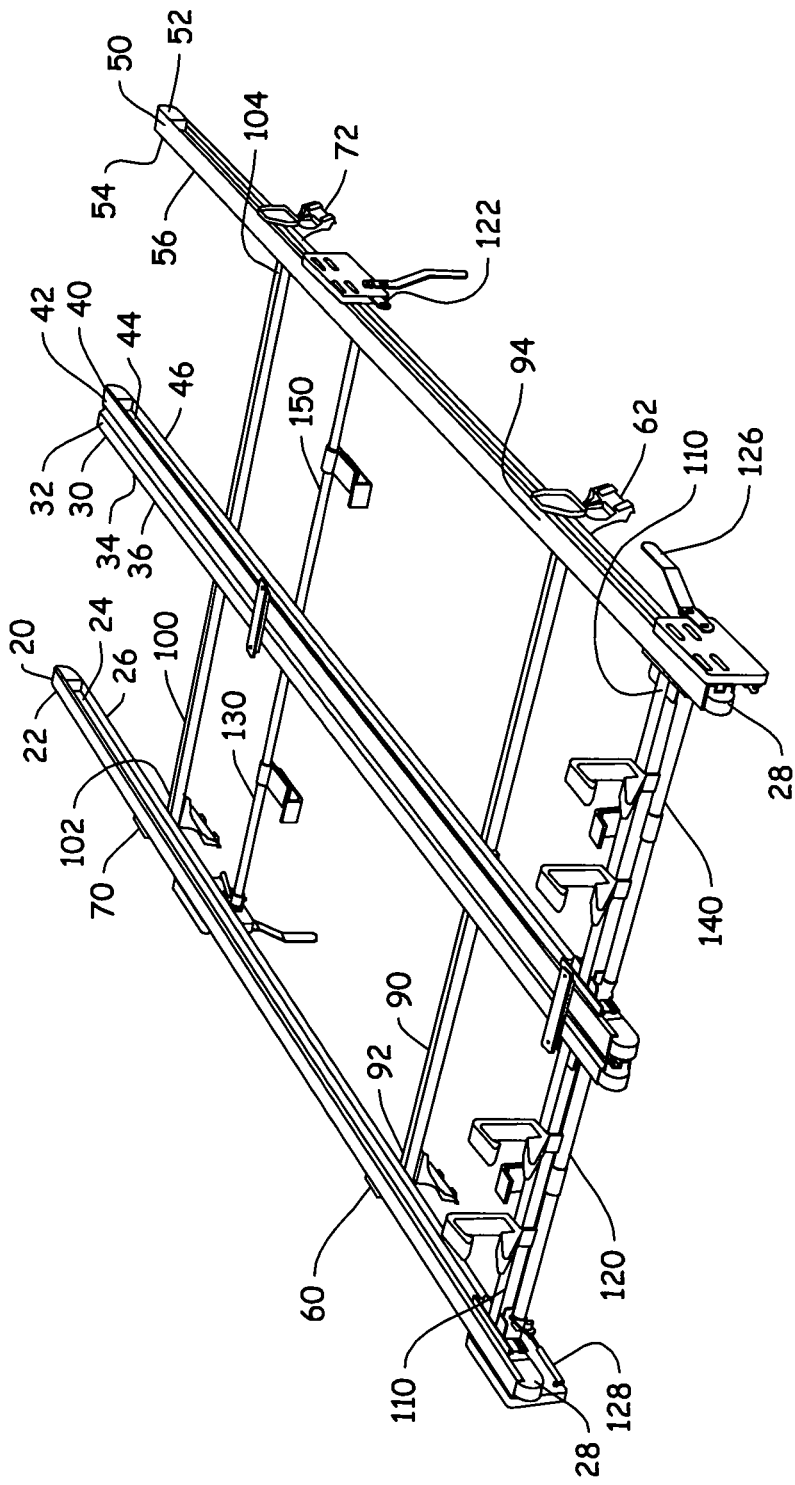
FIG. 2 is another embodiment of the vehicle roof storage system shown in FIG. 1 without a ladder.
Figure 3:
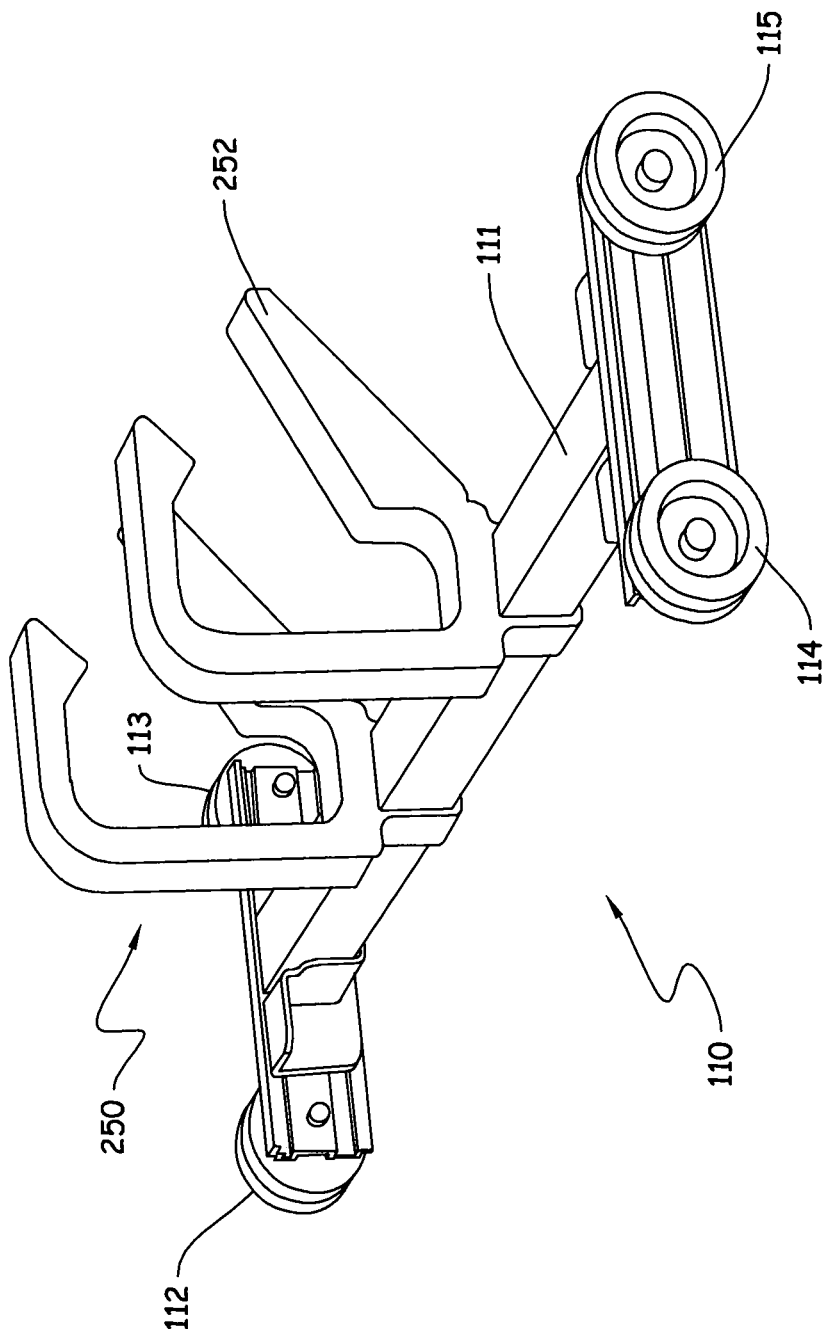
FIG. 3 is a perspective view of a wagon cross member of FIG. 1 and illustrates how a wagon cross member with wheels may be configured.
Figure 4:
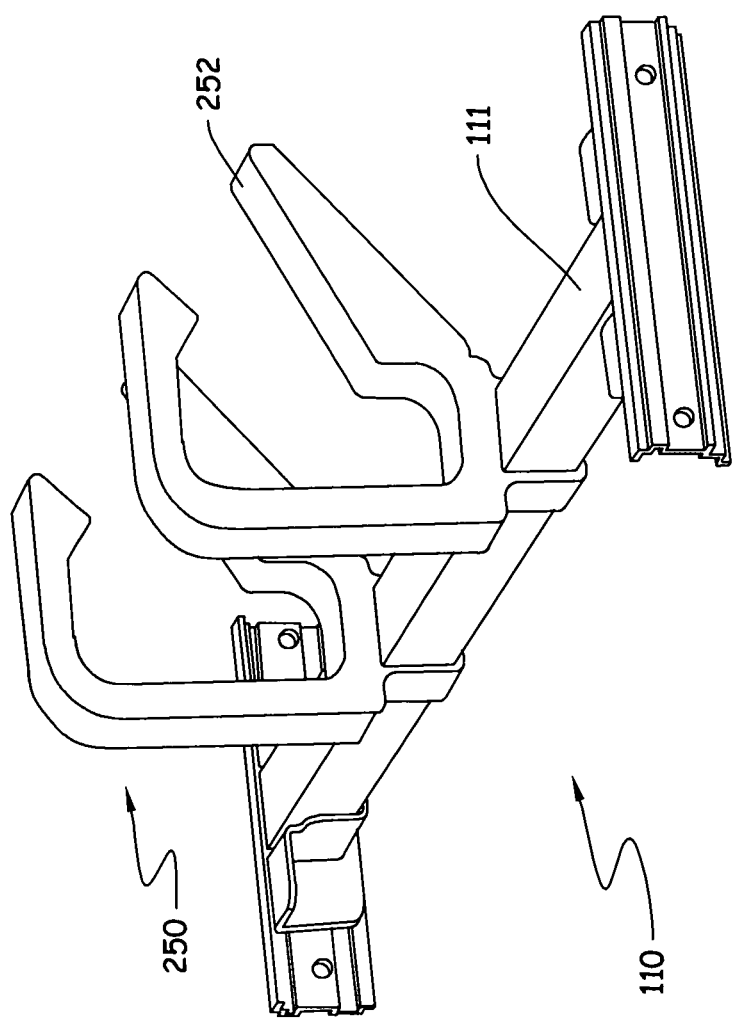
FIG. 4 is a perspective view of an alternative variation of the wagon cross member and illustrates how a wagon cross member may be configured without wheels.
Figure 5:
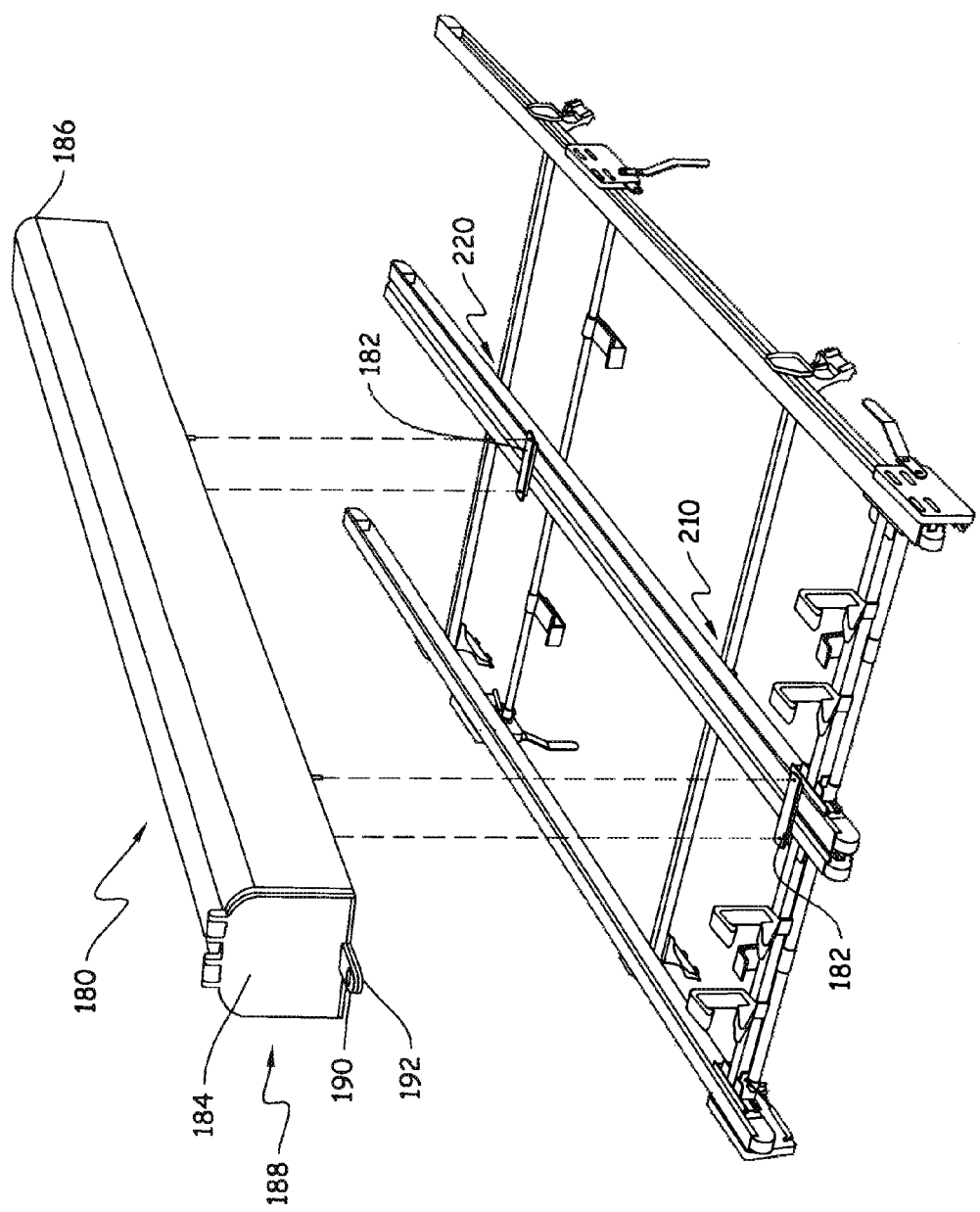
FIG. 5 is another embodiment of the vehicle roof storage system shown in FIG. 1, as shown the apparatus is displayed as a dual rack apparatus capable of carrying multiple ladders and an optional storage box.

The vehicle roof storage system 10 may include a plurality of longitudinally extending rail members, preferably in pairs (e.g. 2, 4, or more) may be made up of individual rail members 20, 30, 40, and 50. The rail members may be spaced apart and are preferably generally parallel to one another. Each rail member 20, 30, 40, and 50 may include an outer surface 22, 32, 42, 52. As shown, the outer surface of each rail member may be substantially planar but it should be appreciated by one skilled in the art that the outer surface may be modified to include a design that is not substantially planar. Furthermore, each rail member 20, 30, 40, and 50 may include an inner portion 24, 34, 44, and 54 respectively and may further include a longitudinally extending channel 26, 36, 46, and 56 respectively. Each rail member 20, 30, 40, and 50 may be configured to be attached to at least one pair of the mounting brackets and/or to at least one transverse cross member. Referring to FIG. 4, an example, of the rail member 20 is shown attached to a mounting bracket 60. Each rail member 20, 30, 40, and 50 may include a stop 28 (e.g. an end cup may be bolted, screwed, glued, etc. . . . onto the end of the rail; a crimp in the channel of the rail; welding a piece of metal into the inner portion of the channel; or tapering the channel so that the rollers cannot continue, etc. . . . ), as shown in FIGS. 1, 2, and 5. The stop 28 preferably will prevent the wagon cross member from sliding out of the rail members 20, 30, 40, 50, and may also act as a safety stop if one of the restraining cross members was not locked in place. There may also be a stop 28 placed inside the inner portion of the rail member 24, 34, 44, and 54.

The rail members may be made of many different materials. Some of these materials may include, but are not limited to, nylon, metal, structural plastics (e.g. a thermoset or a thermoplastic), fiberglass, or combinations thereof. Preferably, the material is one in which can hold up to the environmental (e.g. snow, sleet, rain, etc. . . . ) and loading requirements of this application (e.g. top of a vehicle for holding ladders that could weigh 30 lbs or more).

Referring to FIGS. 1, 2, 5, and 6, the vehicle roof storage system 10 may further include a plurality of mounting brackets (e.g. 2, 3, or more), preferably at least a first pair of mounting brackets 60, 62, and at least a second pair of mounting brackets 70, 72. Each mounting bracket 60, 62, 70, 72 may be configured to be (i) fixedly attached to at least a portion of a roof top 80 of a vehicle 82, (ii) attached (fixedly or removeably) to vertical supports that are attached (fixedly or removeably) to a portion of the vehicle, or (iii) removeably attached to at least a portion of the roof top 80 of the vehicle 82 preferably the mounting bracket will attach via the seam of the roof top 80. It is also contemplated that the mounting bracket may attach via: the inside of a door, the inside of a window, the bed of a truck via vertical support members attached to the truck bed or side walls of the truck bed, a luggage carrier, or the like. The at least first pair of mounting brackets 60, 62 may be longitudinally aligned (i.e. the length of the vehicle) with one another. Likewise, the at least second pair of mounting brackets 70, 72 may be longitudinally aligned (i.e. the length of the vehicle) with one another. It is further contemplated that the pairs of mounting brackets 60, 70 and 62, 72 may be latitudinally aligned (i.e. the width of the vehicle) with one another. For example, brackets 60, 70 and brackets 62, 72 may be aligned so that the brackets may be connected using a transverse cross members, and brackets 60, 62 and 70, 72 may be aligned and then connected using rail members.

Figure 7:
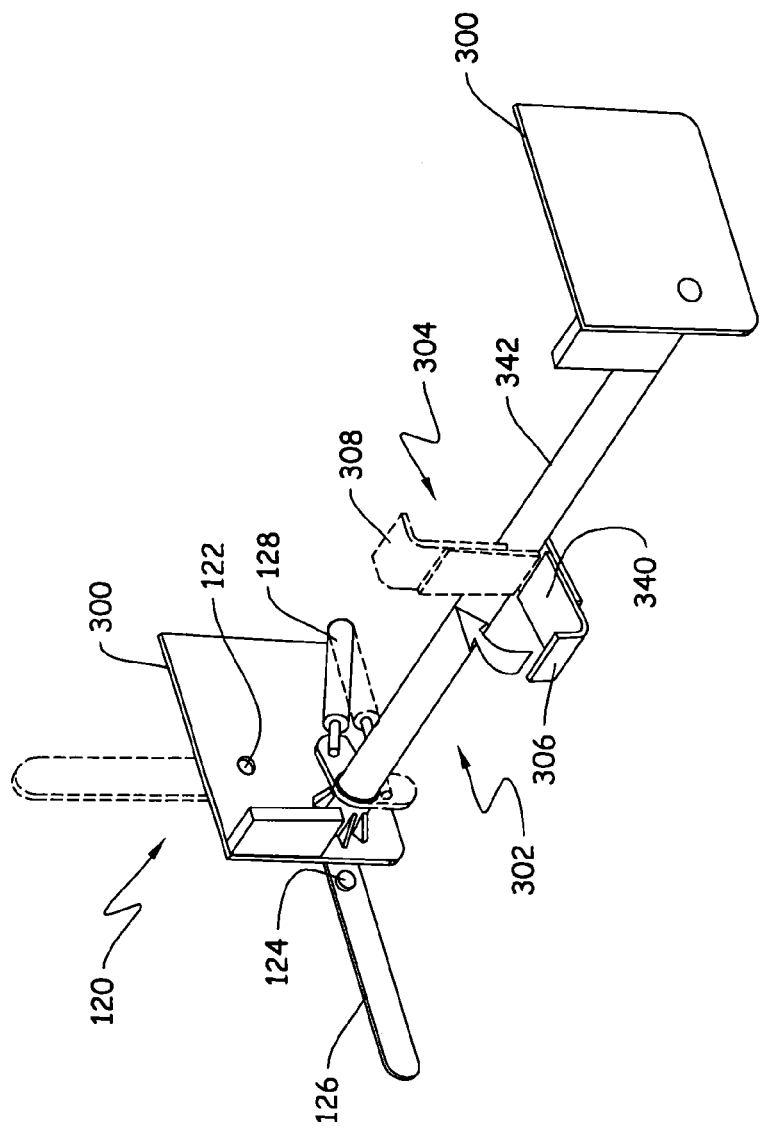
FIG. 7 is a perspective view of a restraining cross member of FIG. 1 and illustrates how the restraining member may be configured.

Referring to FIGS. 1, 2, and 5 the vehicle roof storage system 10 may further include a plurality of transverse cross members (e.g. a first transverse cross member 90 and a second transverse cross member 100). The first transverse cross member 90 includes a first end 92 and a second end 94. Likewise, the second transverse cross member 100 includes a first end 102 and a second end 104. The first ends 92, 102 and second ends 94, 104 of each transverse cross member may be configured to be at least one of (i) fixedly attached to at least one rail member; (ii) fixedly attached to at least one mounting bracket; (iii) detachably attached to at least one mounting bracket via insertion through at least an opening 64 of the bracket; (iv) or a combination thereof. Each end of the transverse members may be attached using different means (e.g. one end may be fixedly attached to a mounting bracket and the other end detachably attached to a mounting bracket). Referring to FIG. 5, the transverse cross member 90 includes a plurality of bores 210, and the other transverse cross member 100 also includes a plurality of bores 220. The bores 210 and 220 allow additional rail members to be secured to the transverse cross members 90 and 100, respectively, as shown in FIGS. 2 and 7, by a restraining cross member 140 described below. It is further contemplated that the mounting brackets 60, 62, 70, 72 may move along the plurality of bores 210, 220 in the transverse cross members.

It is contemplated that the vehicle roof storage system 10 may be used to support multiple ladders. Two ladders may be supported in the apparatus 10 by one ladder being on top of the other ladder and secured to the roof 80 via the vehicle roof storage system 10. Preferably two ladders may be supported in the apparatus 10 by one ladder being adjacent to the other ladder, and both ladders being secured to the roof 80 via the apparatus 10. FIG. 1 shows the vehicle roof storage system 10 carrying a ladder 160 and an available space for an additional ladder. Furthermore, the vehicle roof storage system 10 may be adapted to support and carry an optional storage box 180, as shown in FIG. 5.

Referring to FIGS. 1-5, the vehicle roof storage system 10 may further include a wagon cross member 110. The wagon cross member 110 may include an axle 111 that may be configured to have rotational movement, but preferably the wagon cross member does not rotate. Located on one end of the wagon cross member 110 may be at least one roller 112, but preferably there are at least two rollers 112, 113. Located on the other end of the wagon cross member 110 may be at least one roller 114, but preferably there are at least two rollers 114, 115, if rollers are employed. The rollers 112, 113 may be configured to rest in one channel of the inner surface of one rail member, and the other rollers 114, 115 may be configured to rest in the other channel of the inner surface of the other rail member. The wagon cross member 110 may be adapted for movement longitudinally between the rail members.

It is further contemplated that the wagon cross member 110 may be free of any rollers as illustrated in FIG. 4. The ends of the wagon cross member may be configured to rest in the channels 26, 36, 46, 56 located in the inner surface of the rail members. The channels of the rail members may act as or contain a bearing surface for the wagon cross members to move across. It is contemplated that the bearing surface of the channel may be made of, coated with, or contain a low friction surface, substance, component, or coating (e.g. nylon, Teflon, steel, bearings, rollers, etc. . . . ).

Figure 6:
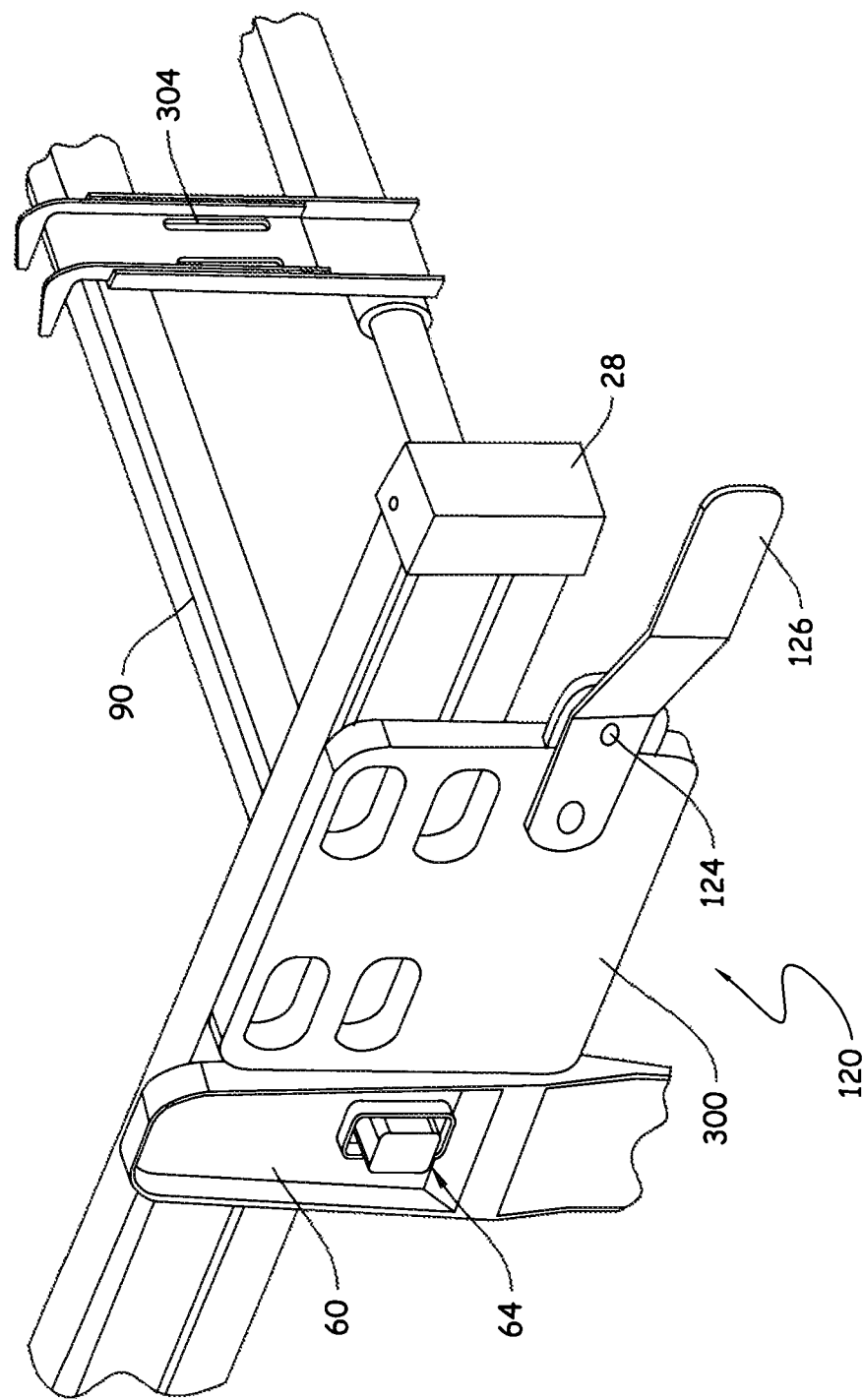
FIG. 6 is a perspective view of an alternative variation of a mounting bracket.

The wagon cross member 110 may be one solid length as shown in FIG. 6, or the wagon cross member may be adjustable in length. The wagon cross member may be lengthened or shortened to accommodate the change in width when the mounting bracket is adjusted inward or outward along the transverse cross member. As can be appreciated by a skilled artisan a telescoping wagon cross member may be employed and the wagon cross members length may be changed by using a telescoping mechanism (e.g. a twist and lock feature, an internal depression push button locking system, a hole with a pin placed though it, or the like).

The wagon cross member may further comprise at least one cradle 250 and more preferably at least two cradles 250. The cradle 250 is attached to the wagon cross member and generally forms a C shape that is designed to securely hold a rung of a ladder. The cradle forms a deep recess and contains an outwardly projecting arm 252. The outwardly projecting arm is design to allow the user to place a rung of a ladder on the arm so that the rung is easily guided into or out of the deep recess of the cradle. The upper side of the cradle facing the outwardly projecting arm may contain a raised portion. This raised portion may form a V shape when viewed from the side.

Any suitable angle (i.e. measured from a vertical line drawn up from the base of the outwardly projecting arm to the face of the outwardly projecting arm) may be employed for an outwardly projecting arm. The outwardly projecting arm may form an angle that is less than about 80 degrees, or even less than about 75 degrees, and more preferably less than about 65 degrees. The outwardly projecting arm may form an angle that is more than about 25 degrees, or even more than about 40 degrees, and more preferably more than about 55 degrees (e.g. about 61 degrees). For example, the outwardly projecting arm 252 may form a gradual incline that allows the user to slowly place a rung of the ladder into the deep recess. It is also contemplated, for example, that the outwardly projecting arm 252 may form a steep incline so that once a rung of the ladder is placed on the outwardly projecting arm the ladder rung slides into the deep recess without user assistance. The outwardly projecting arm may have a length that is less than about 25 cm, or even less than about 20 cm, and more preferably less than about 15 cm (i.e. about 12 cm).

The deep recess of the cradle may have a depth (i.e. measured from the base of the recess to the base of the outwardly projecting arm) that is less than about 25 cm, or even less than about 15 cm, and more preferably less than about 10 cm (e.g. about 4 cm). The deep recess may have a length (i.e. measured from the back of the cradle to the base of the outwardly projecting arm) that is less than about 25 cm, or even less than about 15 cm, and more preferably less than about 10 cm (e.g. about 6 cm). Additional dimensions, views, and features of the cradle can be gleaned from the teachings of FIG. 31 of Provisional application Ser. No. 61/102,209, filed Oct. 2, 2008, incorporated by reference herein.

Although not preferred, the cradle may be adjusted and moved along the wagon cross member. The cradle allows the user to easily move the ladder forward and backward while loading and unloading, and the cradle securely holds the ladder in place while the vehicle is in motion. A lock may be used in conjunction with the cradle (e.g. a cable may be passed though the cradle and around a rung of the ladder and padlocked to the truck, the cradle may include a locking portion that flips up to cover the opening in the cradle and locks onto a rung of the ladder when in the closed position, etc. . . . ).

The vehicle roof storage system 10 further may include at least one restraining cross member, as illustrated in FIG. 7, and preferably two restraining cross members for each ladder. When two restraining members are in use the first restraining cross member prevents the ladder from sliding in one direction (e.g. backwards) and the second restraining cross member prevents the ladder from sliding in the opposite direction (e.g. forward). The restraining members 120 each may include but are not limited to: at one least one attachment bracket 300 with at least one aperture 122; at least one lever arm 126 that includes a locking mechanism 124, and is used in conjunction with the aperture in the attachment bracket; at least one assist mechanism 128 attached to the lever arm; at least one shaft 302 with at least one restraining arm 304, and wherein each restraining arm may have an open position 306 and a closed position 308; each restraining arm may further include a vibration dampening device 340; and may include a roller 342.

More particularly, restraining cross member 120 includes at least one aperture 122, and a locking mechanism 124 adapted to fit into the aperture 122 in order to secure a ladder 160 to the wagon cross member 110, which in turn is used to secure the ladder 160 to the vehicle roof storage system 10 that is attached to the vehicle 82. It is further contemplated that there may be a second aperture to lock to the lever arm 126 in the open position 306 so that the restraining arm does not impede the user when a ladder is loaded into the vehicle roof storage system. Restraining cross members 130, 140, and 150 may operate in the same manner as restraining cross member 120, described in further detail below, and may use the same components to secure the ladder 160 to the vehicle roof storage system 10.

Each restraining cross member 120, 130, 140, 150 may include at least one attachment bracket 300 that may include at least one aperture 122. The lever arm 126 of each restraining cross member may include a locking mechanism 124 adapted to fit in the aperture. The locking mechanism may be any device that fits in the aperture and securely attaches the lever arm to the attachment bracket (e.g. a pin, a dowel, a rod, an internal push button depression locking mechanism, or the like); however other devices may be used to lock the lever in place. (e.g. a bolt, detent, etc. . . . ).

Each restraining cross member 120, 130, 140, 150 may include an assist mechanism 128 that may assist the user in moving the lever arm to the open or close position. The assist mechanism may be any mechanism that aids the user in pushing the lever to the open or close position (e.g. an air cylinder, a spring, a hydraulic cylinder, or the like). The opening or closing assistance device may aid in the rotation of the lock handle and may aid in holding the lever arm in place or both (i.e. may hold the lever arm in place if the locking mechanism fails). It is further contemplated that the lever arms on one side of the vehicle storage system may be effectively tied together so that when one lever arm is moved from the open position to the closed position, or vice versa, the other lever arm also moves.

Each restraining cross member 120, 130, 140, 150 may include a shaft 302 that may rotate. The shaft may further include a restraining arm 304 that may be fixedly attached or removeably attached to the shaft. The restraining arm may rotate with the shaft so that the restraining arm has an open position 306 (i.e. can be lowered so that a ladder can be loaded) and a closed position 308 (i.e. can be raised to restrain a ladder so that it is held in place). The restraining arm 304 may be one solid piece or preferably may be two pieces so that the restraining arm may be adjustable to lengthened or shortened. The two piece restraining arm may be held together by any securing mechanism that will allow the restraining arm's length to be changed (e.g. a screw and nut, a spring loaded clip, and the like). The restraining arm may be configured so that different sized and shaped devices may be used in the vehicle roof storage system 10. Preferably the restraining arm 304 will generally form an L shape. The restraining arm 304 may also be equipped with locking capabilities. A lock may be used in conjunction with the restraining arm (e.g. a cable may be passed though the restraining arm and around a rung of the ladder and padlocked to the truck, the restraining arm may include a locking portion that locks onto a rung of the ladder when in the closed position, etc. . . . ).

One embodiment of the present invention may include a vibration dampening device 340 on the restraining arms. The vibration dampening devices may be made of any material (e.g. rubber, nylon, foam, or the like) that will reduce vibrations and noise as the vehicle is in transit. It is also contemplated that the vibration dampening device may also protect the devices from damage in the case of impact or excessive bouncing.

Each restraining cross member 120, 130, 140, 150 may include one or more rollers 342 located on the shaft 302 of the restraining member so that the device being loaded onto the vehicle roof storage system slides more easily into place. Preferably, only the restraining cross members closest to the loading position of the vehicle roof storage system will contain a roller or rollers (i.e. the restraining member at the rear of the vehicle). It is also contemplated that when the shaft 302 does not include any rollers 342 another device may be utilized such as a slide or track (e.g. a flat piece of metal coated with a friction reducing material, bearings, rollers, etc. . . . ). The restraining cross members may be one solid length, as shown in FIG. 7, or the restraining cross member may be adjustable in length. The restraining cross member may be lengthened or shortened to accommodate the change in width when the mounting bracket is adjusted inward or outward along the transverse cross member. As can be appreciated by a skilled artisan a telescoping restraining cross member may be employed and the restraining cross members length may be changed by using a telescoping mechanism (e.g. a twist and lock feature, an internal depression push button locking system, a hole with a pin placed though it, or the like).

It is contemplated that the wagon cross members may contain an aperture. The aperture may be used to lock the wagon cross member in place while the vehicle roof storage system is not being used so that the wagon cross member stays stationary while the vehicle is in transit. It is further contemplated that the locking mechanism used to hold the lever arm in place may extend into the aperture of the wagon cross member and hold the wagon mechanism in place.

It is contemplated that a storage box 180 may be added to the top of the ladder storage device. The storage box may be fixedly attached to the top of a rail member or rail members and configured so that additional storage may be employed without impeding the use of the ladder storage device. It is also contemplated that the storage box may be removeably attached to the top of a rail member. Preferably, the storage box 180 will be located in the center of the vehicle roof storage system. More preferably, the storage box 180 will rest above the rail members 30, 40. The storage box may rest on attachment brackets 182 that are attached to the rail members. The storage box may rest on two, three, four, or more attachment brackets; however, the storage box will, preferably, rest on two attachment brackets.

It is further contemplated that the storage box 180 may have a hinged cap 184 and fixed cap 186 (i.e. does not open); however, both ends of the storage box may contain hinged caps. The hinged cap 184 may be hinged from the sides or bottom, but preferably the hinge is located on the top of the door 188. The door 188 may contain a locking mechanism so that the contents of the storage box 180 do not come out while the vehicle is in transit. Preferably, the door hinge is held in place by a door pivot pin. However, a skilled artisan would recognize that there are many different types of mechanical fasteners that could be used to securely keep the door closed (e.g. pins, rods, clips, latches, or the like). The door may contain a lip 190 that projects outward away from the door. The base of the storage box may also contain a lip 192 that projects away from the door and runs parallel to the lip of the door. Both lips may contain a hole, which securely holds the door closed when an object is placed through the holes in both lips (e.g. a pin, bolt, padlock, or the like).

Additional aspects of the invention can be gleaned from the teachings herein, including those of FIGS. 1-5 of Provisional application Ser. No. 61/053,167, filed May 14, 2008, incorporated by reference herein, which shows various alternative embodiments. The features shown in the respective embodiments are not limited solely to those embodiments. Rather they may be employed in combination with any of the other embodiments. Though shown as attaching to a roof seam in FIG. 1, the brackets illustrated in FIGS. 1, 2, 5, and 6 may be adapted to attach via different means discussed above. It should also be appreciated that FIGS. 1, 2, and 5 are only a few possible loading configurations and that there are a plurality of different ways the apparatus could be loaded, which are not disclosed, but one skilled in the art would appreciate from these examples.

FIGS. 7-9 of Provisional application Ser. No. 61/053,167, filed May 14, 2008, incorporated by reference herein, and FIGS. 37 and 38 of Provisional application Ser. No. 61/102,209, filed Oct. 2, 2008, incorporated by reference herein, disclose an adjustable mounting bracket and additional embodiments which may be employed.

Additional aspects of the restraining cross member can be gleaned from the teachings herein, including those of FIGS. 12-14, 17, 18, 20-24, and 32-36 of Provisional application Ser. No. 61/102,209, filed Oct. 2, 2008, incorporated by reference herein, which disclose different possible configurations that may be employed by one skilled in the art to create a restraining cross member, including but not limited to two attachment brackets.

Additional aspects of the wagon cross member can be gleaned from the teachings herein, including those of FIGS. 6, 15, 16, 19, 26-29, and 31 of Provisional application Ser. No. 61/102,209, filed Oct. 2, 2008, incorporated by reference herein, which disclose some additional embodiments that may be used in the wagon cross member. These Figures and examples are not intended to be limiting to the design of the wagon cross member but are intended to disclose additional variations that may be employed.

Additional aspects of the rail members can be gleaned from the teachings herein, including those of FIGS. 9-11, and 30 of Provisional application Ser. No. 61/102,209, filed Oct. 2, 2008, incorporated by reference herein. For example, FIG. 30 discloses one variation of an end cap that may be used to cap the ends of the rail members.

The following discussion applies to the teachings as a whole. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. References to the term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. Likewise, any reference to "first" or "second" items is not intended to foreclose additional items (e.g., third, fourth, or more items); such additional items are also contemplated, unless otherwise stated.

It is understood that the above description is intended to be illustrative and not restrictive. Many embodiments as well as many applications besides the examples provided will be apparent to those of skill in the art upon reading the above description. It is further intended that any combination of the features of different aspects or embodiments of the invention may be combined. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. An apparatus for securing a ladder to an exterior of a vehicle, comprising:
   a plurality of longitudinally extending rail members being spaced apart and substantially parallel to one another, wherein each longitudinally extending rail member has a first end and a second end; at least a first pair of mounting brackets and at least a second pair of mounting brackets either: (i) fixedly attached to a portion of the vehicle or (ii) detachably attached to a portion of the vehicle,
   wherein at least two of the plurality of longitudinally extending rail members are in communication with the first pair of mounting brackets, the second pair of mounting brackets, or both pairs of mounting brackets;
   at least a first transverse cross member and a second transverse cross member, wherein each transverse cross member has a first end and a second end, and the first end, the second end, or both ends of the first transverse cross member and the second transverse cross member are in communication with the at least the first pair of mounting brackets or the at least the second pair of mounting brackets;
   at least one wagon cross member, wherein the at least one wagon cross member has a first end and a second end, and the first end and the second end of the at least one wagon cross member are each in communication with at least one of the plurality of longitudinally extending rail members; and
   at least one cradle that is attached to the at least one wagon cross, the at least one cradle having:
   a body portion including a deep recess and the body portion being generally C shaped with an open side,
   a top end of the body portion having a terminal end forming an upper portion of the open side,
   a bottom end of the body portion having a terminal end forming a lower portion of the open side and being located substantially below the too end so that the open side is located between the too end and the bottom end, and
   an outwardly projecting arm extending cantilever from the bottom end beyond the top end so that the cantilever portion of the outwardly projecting arm forms a platform that a rung of a ladder can contact to assist a user in inserting the ladder into the open side of the generally C shaped cradle so that when a rung of the ladder is placed on the outwardly projecting arm the outwardly projecting arm guides the ladder under the too end and into the deep recess in a longitudinally forward direction, and wherein the deep recess prevents movement of the ladder in a longitudinally rearward direction and a longitudinally forward direction relative to the cradle while the ladder remains securely in the deep recess of at least one cradle;
   wherein the at least one wagon cross member includes the at least one cradle, and the at least one wagon cross member is slideable longitudinally along the plurality of longitudinally extending rail members while the first end, the second end, or both ends of the at least one wagon cross member are in communication with at least one of the plurality of longitudinally extending rail members so that when the ladder is placed in the at least one cradle, the at least one wagon cross member assists in moving the ladder longitudinally along the plurality of longitudinally extending rail members and unto the exterior of the vehicle;
   at least one restraining cross member,
   wherein the restraining cross member has a first end and a second end, and the first end, second end, or both ends of the at least one restraining cross member is in communication with at least one of the plurality of longitudinally extending rail members; and
   wherein the at least one restraining cross member is longitudinally stationary and the at least one restraining cross member further comprises a restraining arm, which is movable into contact with the ladder so that the ladder, when in the apparatus on the exterior of the vehicle is prevented from moving, and
wherein a portion of the restraining cross member rotates.

2. The apparatus of claim 1, wherein the plurality of longitudinally extending rail members further comprise a channel that runs longitudinally along each of the plurality of longitudinally extending rail members and a portion of the at least one wagon cross member extends into the channel so that the at least one wagon cross member is movable along the plurality of longitudinally extending rail members, and the channel comprises a bearing surface.

3. The apparatus of claim 2, wherein the apparatus includes a storage box and the storage box is connected to and supported on the at least one of the longitudinally extending rail members by attachment brackets, the storage box including a hinged cap on one end and a fixed cap on an opposing end so that items can be removed from the storage box while the storage box is connected to the apparatus.

4. The apparatus of claim 3, wherein the storage box is fixedly attached, removably attached, or both to the at least one longitudinally extending rail member.

5. The apparatus of claim 4, wherein the at least first transverse cross member and the second transverse cross member contain a plurality of bores so that additional longitudinally extending rail members can be secured to the transverse cross members.

6. The apparatus of claim 2, wherein the moveable wagon cross member is configured to rest in the channel of at least one of the longitudinally extending rail member.

7. The apparatus of claim 1, wherein the restraining cross member is fixedly attached to at least one of the longitudinally extending rail members, and the restraining cross member includes a lever arm.

8. The apparatus of claim 7, wherein the lever arm of the restraining cross member further comprises an assist mechanism attached to the lever arm so that the assist mechanism assists a user in moving the lever arm between an open position and a closed position.

9. The apparatus of claim 1, wherein the mounting bracket is configured to at least partially surround a portion of the first end, second end, or both ends of the at least first transverse cross member, second transverse cross member, or both transverse cross members.

10. The apparatus of claim 1, wherein the first end, second end, or both ends of the at least first transverse cross member, second transverse cross member, or both transverse cross members are fixedly attached to the mounting bracket.

11. The apparatus of claim 1, wherein the moveable wagon cross member includes at least one roller on the first end, second end, or both ends.

12. The apparatus of claim 1, wherein the moveable wagon cross member slides along the plurality of longitudinally extending rail members, the movable wagon cross member being free of a roller on the first end, second end, or both ends.

13. The apparatus of claim 1, wherein the longitudinally extending rail members further comprise an end cup on the first end, second end, or both ends.

14. The apparatus of claim 1, wherein the at least one restraining cross member is located in a rear end of the vehicle and the restraining cross member includes one or more rollers located on a shaft of the restraining cross member so that the ladder being loaded onto a roof of the vehicle slides along the one or more rollers.

15. The apparatus of claim 1, wherein the outwardly projecting arm contains a raised portion extending from the bottom end towards the too end and the raised portion has a gradual incline, at about 25 degrees or more, that allows the user to slowly place a rung of the ladder into the deep recess and the raised portion forms a V shape when viewed from the side.

16. The apparatus of claim 1, wherein the outwardly projecting arm contains a raised portion extending from the bottom end towards the top end and the raised portion has a steep incline, at about 80 degrees or less, so that once a rung of the ladder is placed on the outwardly projecting arm the ladder rung slides into the deep recess without user assistance and the raised portion forms a V shape when viewed from the side.

17. A roof storage system for securing a ladder to an exterior of a vehicle comprising:
   a) a plurality of spaced apart longitudinally extending rail members, the plurality of spaced apart longitudinally extending rail members each including:
      i. an outer surface,
      ii. an inner surface,
      iii. a continuous channel in and along a length of the inner surface, the continuous channel being a bearing surface; and
      iv. a stop in each end of each of the channels;
   b) a first transverse cross member in communication with each of the plurality of spaced apart longitudinally extending rail members;
   c) a second transverse cross member spaced apart from the first transverse cross member and being in communication with each of the plurality of spaced apart longitudinally extending rail members;
   d) a pair of mounting brackets connected to each of the first transverse cross member and the second transverse cross member, the pair of mounting brackets being either (i) fixedly attached to a portion of the vehicle or (ii) detachably attached to a portion of the vehicle;
   e) at least one restraining cross member located adjacent to each of the plurality of spaced apart longitudinally extending rail members, the at least one restraining cross member being rotationally movable and including:
      i. a shaft;
      ii. a restraining arm connected to the shaft so that upon rotation of the shaft the restraining arm is rotated from an open position where the ladder can be placed into and/or removed from the roof storage system and to a closed position where the ladder is restrained in the roof storage system; and
      iii. at least one attachment bracket connected to one end of the shaft;
   f) at least one wagon cross member having:
      i. a first end that is in direct communication with the bearing surface in one of the channels in one of the plurality of longitudinally extending rail members, wherein the first end is free of rollers;
      ii. a second end that is in direct communication with a channel in another one of the channels in another one of the plurality of longitudinally extending rail members, wherein the second end is free of rollers; and
   g) two cradles each connected to the at least one wagon cross member, the two cradles each having:
      i. a body portion forming a deep recess and being generally C shaped with an open side,
      ii. a top end having a terminal portion,
      iii. a bottom end having a terminal location with the bottom end being located under the too end with the open side located between the top end and the bottom end,
      iv. an outwardly projecting arm extending cantilever from the bottom end forming a platform that a rung of a ladder contacts to assist a user in inserting the ladder under the too end and into the open side of the generally C shaped cradle so that when a rung of the ladder is placed on the outwardly projecting arm, the outwardly projecting arm guides the ladder into the deep recess so that a user can move the ladder in a longitudinally forward direction and a longitudinally rearward direction while a rung of the ladder remains securely in the at least one cradle;

wherein the outwardly projecting arm extends at an angle towards the too end and beyond the too end so that the platform receives the rung of the ladder;

wherein the two cradles receive a same rung of the ladder; and wherein the stop in each end of each of the channels prevents the wagon cross member from sliding out of the channel in the plurality of longitudinally extending rail members; and wherein the wagon cross member slides along the channels in the plurality of longitudinally extending rail members so that when the rung of the ladder is placed in the at least one cradle at a rear end of the vehicle the wagon cross member can be slid towards a forward end of the vehicle assisting a user is placing the ladder on the exterior of the vehicle.

18. The roof storage system of claim 17, wherein the at least one attachment bracket includes:

1. at least one aperture,
2. at least one lever arm, and
3. at least one locking mechanism that fits into the at least one aperture so that movement of the at least one lever arm is prevented and a ladder is secured within the roof storage system.

19. The roof storage system of claim 18, wherein the at least one cradle has a deep recess for holding the rung of the ladder, and wherein the at least one restraining cross member is two restraining cross members that are longitudinally spaced apart and adjacent to each of the plurality of spaced apart longitudinally extending rail members so that one restraining cross member restrains the ladder at a front of the vehicle and a second restraining cross member restrains the ladder at a rear of the vehicle.

20. The apparatus of claim 18, wherein the outwardly projecting arm contains a raised portion extending from the bottom end towards the too end and the raised portion has a gradual incline, at about 25 degrees or more, that allows the user to slowly place a rung of the ladder into the deep recess, or wherein the outwardly projecting arm contains a raised portion that has a steep incline, at about 80 degrees or less, so that once a rung of the ladder is placed on the outwardly projecting arm the ladder rung slides into the deep recess without user assistance and the incline of the raised portion forms a V shape when viewed from the side.

* * * * *

UNITED STATES PATENT AND TRADEMARK OFFICE
CERTIFICATE OF CORRECTION

PATENT NO.         : 9,156,411 B2  
APPLICATION NO.    : 12/989693  
DATED              : October 13, 2015  
INVENTOR(S)        : Frank Elezaj Page 1 of 1

It is certified that error appears in the above-identified patent and that said Letters Patent is hereby corrected as shown below:

In the claims

Column 10, Claim 1, Line 29, "too" should be --top--

Column 10, Claim 1, Line 30, "too" should be --top--

Column 10, Claim 1, Line 39, "too" should be --top--

Column 11, Claim 15, Line 66, "too" should be --top--

Column 12, Claim 17, Line 63, "too" should be --top--

Column 13, Claim 17, Line 2, "too" should be --top--

Column 13, Claim 17, Line 11, reads: "towards the too end and beyond the too end so that the" should be --towards the top end and beyond the top end so that the--

Column 14, Line 18, "too" should be --top--

Signed and Sealed this  
Eighth Day of March, 2016

Michelle K. Lee  
*Director of the United States Patent and Trademark Office*